(12) United States Patent
Hara (10) Patent No.: US 9,143,077 B2
(45) Date of Patent: Sep. 22, 2015

(54) CONVEYING SYSTEM

(71) Applicant: KABUSHIKI KAISHA YASKAWA DENKI, Kitakyushu-shi (JP)

(72) Inventor: Koji Hara, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/105,187

(22) Filed: Dec. 13, 2013

(65) Prior Publication Data

US 2014/0097783 A1    Apr. 10, 2014

Related U.S. Application Data

(63) Continuation of application No. PCT/JP2011/063703, filed on Jun. 15, 2011.

(51) Int. Cl.
*H02P 25/06* (2006.01)
*B65G 54/02* (2006.01)

(52) U.S. Cl.
CPC ............... *H02P 25/06* (2013.01); *B65G 54/02* (2013.01)

(58) Field of Classification Search
CPC ........................................................ H02P 25/06
USPC ..................................... 318/625, 560, 34, 38
See application file for complete search history.

(56) References Cited

U.S. PATENT DOCUMENTS

| 4,926,105 A * | 5/1990 | Mischenko et al. | 318/800 |
| 5,119,007 A * | 6/1992 | Tunehiro et al. | 318/801 |
| 5,359,154 A * | 10/1994 | Tsukasa et al. | 177/145 |
| 6,731,094 B1 * | 5/2004 | Itoh et al. | 318/727 |

FOREIGN PATENT DOCUMENTS

| JP | 07-327301 | 12/1995 |
| JP | 09-182215 | 7/1997 |
| JP | 2000-023316 | 1/2000 |
| JP | 2001-112119 | 4/2001 |
| JP | 2003-146432 | 5/2003 |

OTHER PUBLICATIONS

Chinese Office Action for corresponding CN Application No. 201180071567.2, Nov. 27, 2014.
Japanese Office Action for corresponding JP Application No. 2012-540203, Jan. 10, 2013.
(Continued)

*Primary Examiner* — David S Luo
(74) *Attorney, Agent, or Firm* — Mori & Ward, LLP (57) ABSTRACT

A conveying system includes: a linear induction motor including a stator provided with a plurality of primary coils arranged along a conveying path and a mover provided movably along the conveying path; one or more first inverters that are provided corresponding to at least one of the primary coils in one or more areas requiring positioning on the conveying path to perform vector control with a sensor; one or more second inverters that are provided corresponding to at least of the primary coils in one or more areas requiring no positioning on the conveying path to perform V/F control; and a controller that is configured to output a speed reference to the first second inverters to control electric supply to the primary coils and to output the speed reference based on a feedback position received from a detector to the first inverter, to perform position control.

20 Claims, 7 Drawing Sheets

(56) References Cited

OTHER PUBLICATIONS

International Search Report for corresponding International Application No. PCT/JP2011/063703, Mar. 19, 2012.

Written Opinion for corresponding International Application No. PCT/JP2011/063703, Mar. 19, 2012.

Korean Office Action for corresponding KR Application No. 10-2014-7000955, Apr. 27, 2015.

* cited by examiner

CONVEYING SYSTEM

CROSS-REFERENCE TO RELATED APPLICATION

This application is a continuation of International Application No. PCT/JP2011/063703, filed on Jun. 15, 2011, the entire contents of which are incorporated herein by reference.

FIELD

The embodiment discussed herein is directed to a conveying system that conveys an object using a linear induction motor as a driving source.

BACKGROUND

Widely known are conveying systems using a linear induction motor as a driving source and including a plurality of primary coils arranged along a conveying path and a secondary conductor provided in a manner facing the primary coils on a moving body movably arranged on the conveying path. Such conveying systems supply electricity to the primary coils, thereby sequentially applying a thrust to the secondary conductor to move the moving body.

Conventionally, there has been developed a conveying system that is provided with inverters for respective primary coils and that controls electric supply to each coil with a control reference received from a central controller. Related conventional technologies include a technique described in Japanese Patent Application Laid-open No. H7-327301.

Conveying systems have a general technological target to convey an object accurately by carrying out positioning with high accuracy. The conventional technology, however, has no description about specific control, specifically, positioning control of the primary coils, thereby failing to carry out highly accurate positioning. As a result, the conventional technology cannot achieve the technological target described above.

SUMMARY

A conveying system according to an aspect of the embodiment includes a linear induction motor, one or more first inverters, one or more second inverters, and a controller. The linear induction motor includes a stator provided with a plurality of primary coils arranged along a conveying path and a mover provided movably along the conveying path and provided with a secondary conductor facing the primary coils. The one or more first inverters are provided corresponding to at least one of the primary coils arranged in one or more areas requiring positioning on the conveying path to perform vector control with a sensor. The one or more second inverters are provided corresponding to at least one of the primary coils in one or more areas requiring no positioning on the conveying path to perform V/F control. The controller is configured to output a speed reference to the first and second inverters to control electric supply to the primary coils.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

An embodiment is described below with reference to the accompanying drawings.

Figure 1:
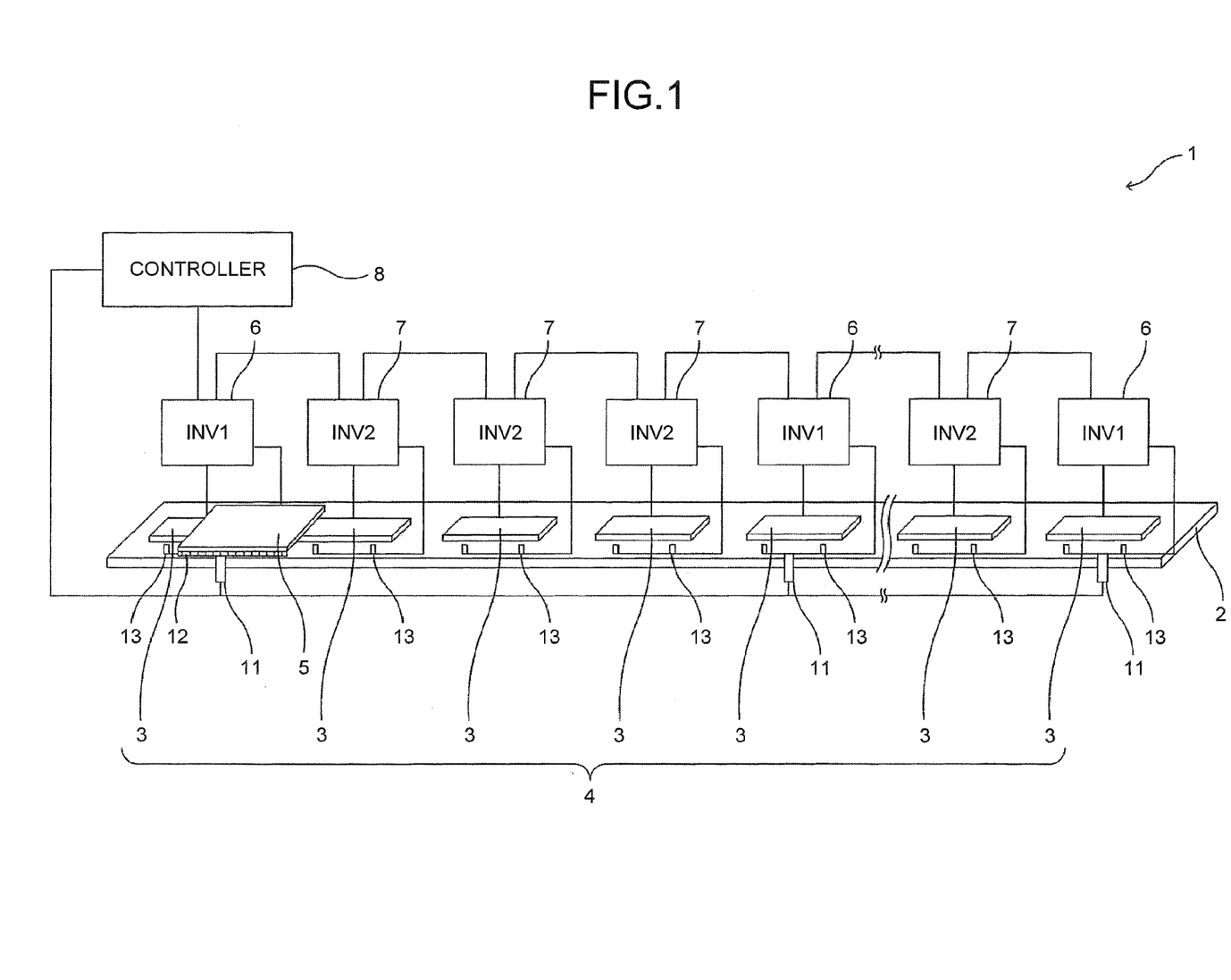
FIG. 1 is a system configuration diagram of a schematic configuration of a conveying system according to an embodiment.

As illustrated in FIG. 1, a conveying system 1 according to the present embodiment is a conveying system that conveys an object (not illustrated) using a linear induction motor as a driving source. The conveying system 1 has a linear induction motor including a stator 4 provided with a plurality of primary coils 3 arranged along a conveying path 2 formed in an approximately linear shape and a mover 5 provided movably along the conveying path 2 and provided with a secondary conductor (not illustrated) facing the primary coils 3. The conveying system 1 further includes a first inverter 6 (represented by "INV1" in FIG. 1) provided corresponding to a primary coil 3 in an area that requires positioning on the conveying path 2, a second inverter 7 (represented by "INV2" in FIG. 1) provided corresponding to a primary coil 3 in an area that requires no positioning on the conveying path 2, and a controller 8 that outputs a speed reference (i.e. speed command) to the first inverter 6 and the second inverter 7 to control electric supply to the primary coils 3. Herein, means for performing vector control corresponds to the first inverter 6, means for performing V/F control corresponds to the second inverter 7, and means for outputting a speed reference corresponds to the controller 8.

The first inverters 6 and the second inverters 7 are provided to the respective primary coils 3 such that one inverter controls one primary coil 3. The first inverters 6 and the second inverters 7 are connected in a manner capable of transmitting and receiving information to and from the controller 8 and among the inverters. Hereinafter, a combination of each of the inverters 6 and 7 and the primary coil 3 corresponding thereto is referred to as a "station", a combination of the first inverter 6 and the primary coil 3 corresponding thereto is referred to as a "positioning station", and a combination of the second inverter 7 and the primary coil 3 corresponding thereto is referred to as a "speed control station" as appropriate. While the conveying system 1 in the example of FIG. 1 includes three positioning stations at two positions on both ends of the conveying path 2 and one position in the middle thereof, the position and the number of positioning stations are not limited thereto. The position and the number of positioning stations can vary depending on system specifications, for example.

The area that requires positioning on the conveying path 2, that is, the area adjacent to the primary coil 3 of the positioning station is provided with an optical or magnetic detector 11. The detector 11 optically or magnetically detects a scale 12 provided to the mover 5. Based on the detection signal, a signal processing circuit (not illustrated) generates position data of a pulse signal and outputs the pulse signal to the first inverter 6 and the controller 8. The first inverter 6 converts the pulse signal into a speed by performing a difference operation or the like in a control circuit unit 64, which will be described later. The first inverter 6 incorporates the speed into a speed loop as a feedback speed. The controller 8 incorporates the pulse signal into a position loop as a feedback position. While the aspect of the position data output from the signal processing circuit is not limited to the pulse signal and may include various aspects, such as serial data and an analog sine wave, the pulse signal is described herein as an example. Both ends of each primary coil 3 in the conveyance direction in the positioning station and the speed control station are provided with respective two photo sensors 13 that switch control of the station corresponding thereto. The photo sensors 13 detect whether the mover 5 is present and output a detection signal to the inverters 6 and 7 corresponding thereto. The detector 11 corresponds to an example of a first sensor disclosed in the claims, and the photo sensor 13 corresponds to an example of a second sensor.

Figure 2:
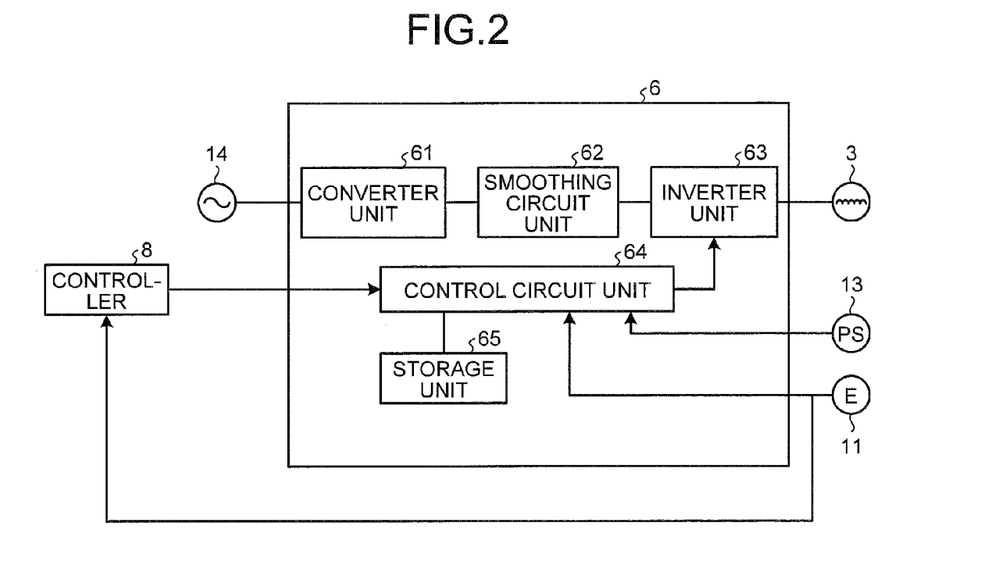
FIG. 2 is a block diagram of a functional configuration of a first inverter.

As illustrated in FIG. 2, the first inverter 6 includes a converter unit 61 that converts alternating current (AC) power supplied from an AC power supply 14 into direct current (DC) power, a smoothing circuit unit 62 that smoothes the DC power thus converted, an inverter unit 63 that converts the DC power into AC power of a predetermined frequency based on a speed reference received from the control circuit unit 64 and supplies the AC power to the primary coil 3 of the positioning station, the control circuit unit 64 that mainly controls the inverter unit 63, and a storage unit 65 formed of a memory and the like.

The control circuit unit 64 converts a pulse signal received from the detector 11 into a speed by performing a difference operation or the like and incorporates the speed into a speed loop as a feedback speed. The control circuit 64 then performs a vector operation based on a deviation between a speed reference received from the controller 8 and the feedback speed and outputs a pulse width modulation (PWM) signal to the inverter unit 63, for example. Thus, the speed loop is formed, whereby the first inverter 6 performs vector control with a sensor using the feedback speed. By contrast, the controller 8 receives a pulse signal from the detector 11 as a feedback position. Based on a deviation between a position reference and the feedback position, the controller 8 outputs a speed reference to the control circuit unit 64 of the first inverter 6. Thus, the position loop is formed, whereby the position control of the mover 5 is performed.

Figure 3:
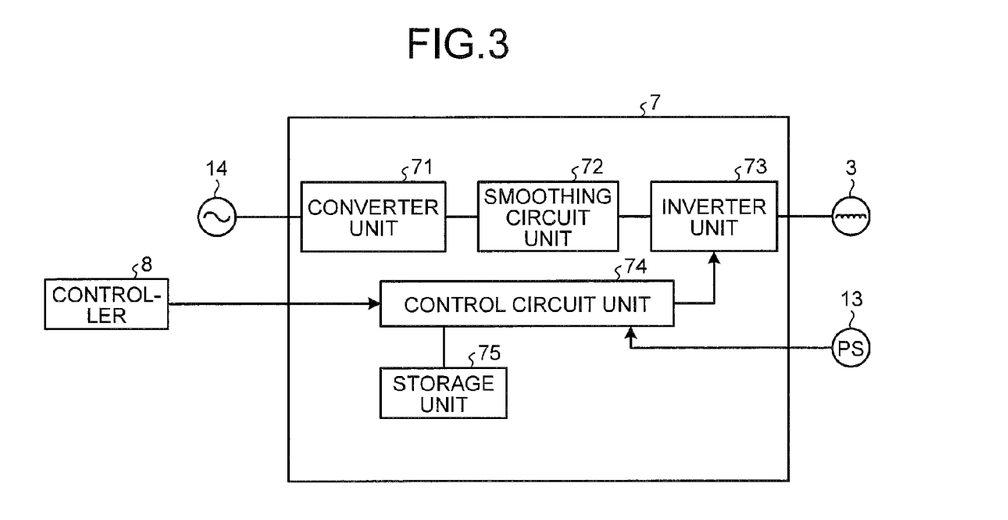
FIG. 3 is a block diagram of a functional configuration of a second inverter.

As illustrated in FIG. 3, the second inverter 7 includes a converter unit 71 that converts AC power supplied from the AC power supply 14 into DC power, a smoothing circuit unit 72 that smoothes the DC power thus converted, an inverter unit 73 that converts the DC power into AC power of a predetermined frequency based on a speed reference received from a control circuit unit 74 and supplies the AC power to the primary coil 3 of the speed control station, the control circuit unit 74 that mainly controls the inverter unit 73, and a storage unit 75 formed of a memory and the like.

The control circuit unit 74 performs an operation so as to make the ratio of an output voltage and an output frequency approximately constant and outputs a speed reference to the inverter unit 73. Thus, the second inverter 7 performs voltage/frequency (V/F) control, thereby controlling the speed of the mover 5.

In the conveying system 1 having the configuration described above, the mover 5 carrying an object starts to accelerate rightward from the position above the leftmost positioning station in FIG. 1. The mover 5 usually moves at a constant speed above the positioning station and the control of the mover 5 shifts to the speed control station adjacent to the positioning station on the right. After the shift, the mover 5 is controlled by the V/F control performed by the second inverter 7. After the mover 5 moves at a constant speed above one or a plurality of speed control stations and reaches the positioning station positioned on the right side, the control shifts to the vector control with a sensor performed by the first inverter 6. The mover 5 is positioned at a predetermined position set in advance in the controller 8 with high accuracy.

Figure 4A:
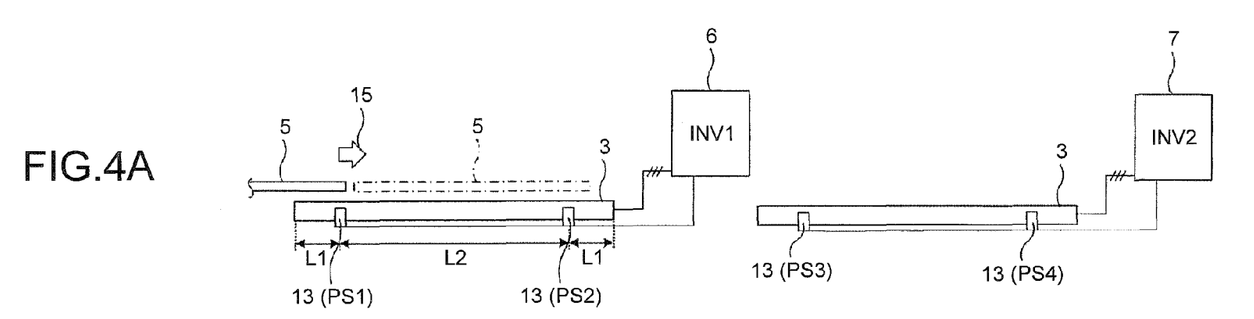
FIG. 4A is a conceptual side view of a positioning station and a speed control station for explaining switching of control of the stations by photo sensor detection signals.
Figure 4B:
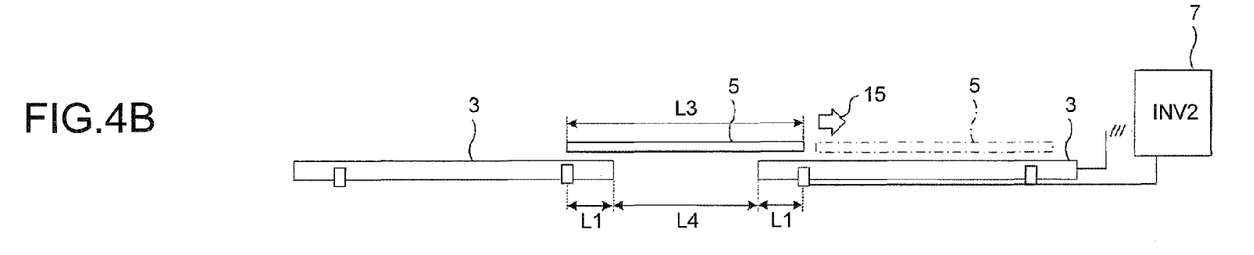
FIG. 4B is a conceptual side view of a positioning station and a speed control station for explaining switching of control of the stations by photo sensor detection signals.
Figure 4C:
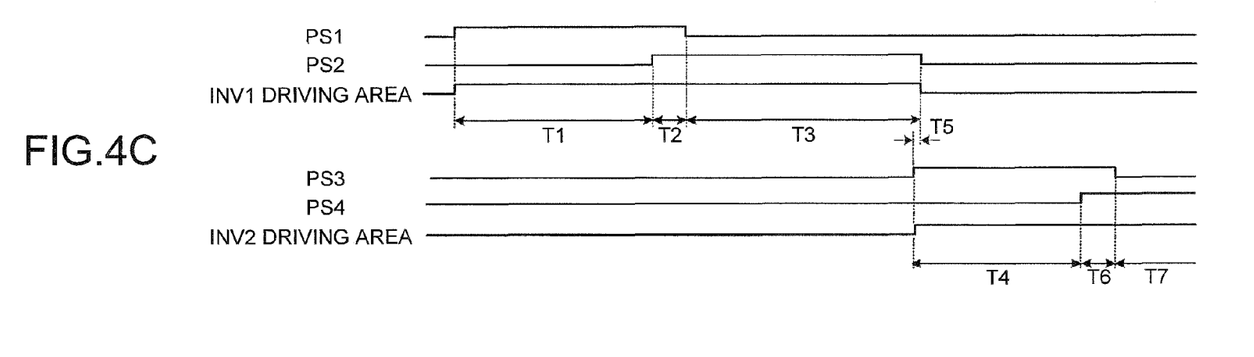
FIG. 4C is a diagram of ON and OFF sections of each photo sensor.

The following describes switching of control between the positioning station and the speed control station. The control circuit unit 64 of the first inverter 6 and the control circuit unit 74 of the second inverter 7 each receive a detection signal from the photo sensor 13, thereby switching control of the respective stations based on the detection signal. The switching will be described in detail with reference to FIGS. 4A to 4C. FIGS. 4A to 4C illustrate the case where the control is switched from the positioning station to the speed control station as an example.

As illustrated in FIG. 4A, the first inverter 6 of the positioning station and the second inverter 7 of the speed control station are each connected to the two photo sensors 13 arranged on both ends of the primary coil 3 corresponding thereto in the conveyance direction. The inverters 6 and 7 each receive a detection signal directly from the photo sensors 13. The inverters 6 and 7 each receive a speed reference and a driving direction from the controller 8 in advance before the mover 5 enters an operation area and wait in a base block state. If at least one of the two photo sensors 13 detects the mover 5 (sensor ON), the inverters 6 and 7 each supply electricity to the primary coil 3 corresponding thereto. If neither of the photo sensors 13 detects the mover 5 (sensor OFF), the inverters 6 and 7 each stop supplying electricity to the primary coil 3 corresponding thereto.

Specifically, as illustrated in FIG. 4A, each photo sensor 13 is arranged at a position away from the end of the primary coil 3 by a distance L1. An interval L2 between the photo sensors 13 and 13 is smaller than a length L3 of the secondary conductor (conductor having the same size as that of the mover 5; the same applies hereinafter) of the mover 5 in the conveyance direction. The distance L1 is approximately equal to the length of one pole of the primary coil 3. This enables the secondary conductor to face at least one pole of the primary coil 3 when the photo sensor 13 detects the mover 5. As illustrated in FIG. 4B, the primary coils 3 are arranged at an interval L4 in such a manner that the secondary conductor of the mover 5 can face one pole of at least one of the primary coils 3 adjacent to each other. The interval L4 is smaller than a length obtained by subtracting twice the length of L1 from L3.

The following describes switching of control from the positioning station to the speed control station in detail. For convenience of explanation, the photo sensors 13 are represented by reference numerals PS1, PS2, PS3, and PS4 in order from the upstream side (left side in FIGS. 4A and 4B) to the downstream side (right side in FIGS. 4A and 4B) in the conveyance direction of the mover 5 (direction of an arrow 15 in FIGS. 4A and 4B).

As illustrated in FIGS. 4A and 4C, if the mover 5 moves to the area of the primary coil 3 of the positioning station and reaches a position facing the photo sensor PS1, the photo sensor PS1 is turned ON, and the first inverter 6 starts to supply electricity to the primary coil 3 (a section of T1 in FIG. 4C). Subsequently, if the mover 5 reaches a position above the photo sensor PS2, the photo sensor PS2 is turned ON. Because the interval L2 between the photo sensors 13 and 13 is smaller than the length L3 of the mover 5 as described above, both the photo sensors PS1 and PS2 are in the ON-state (a section of T2 in FIG. 4C). If the mover 5 stops facing the photo sensor PS1, the photo sensor PS1 is turned OFF, and the photo sensor PS2 alone is in the ON-state (a section of T3 in FIG. 4C). The mover 5 in this state is represented by a dashed-dotted line in FIG. 4A.

Subsequently, as illustrated in FIGS. 4B and 4C, if the mover 5 moves to the area of the primary coil 3 of the next speed control station and reaches a position facing the photo sensor PS3, the photo sensor PS3 is turned ON, and the second inverter 7 starts to supply electricity to the primary coil 3 (a section of T4 in FIG. 4C). Because the interval L4 between the primary coils 3 is smaller than the length obtained by subtracting twice the length of L1 from L3 as described above, that is, the interval between the photo sensors PS2 and PS3 is smaller than the length L3 of the mover 5, both the photo sensors PS2 and PS3 are in the ON-state (a section of T5 in FIG. 4C). FIG. 4B illustrates this state. Thus, it is possible to prevent the mover 5 from being positioned at neither of the driving areas of the stations. If the mover 5 further moves and stops facing the photo sensor PS2, the photo sensor PS2 is turned OFF, and the first inverter 6 stops supplying electricity to the primary coil 3.

Subsequent control performed by the speed control station is the same as described above. If the mover 5 reaches a position above the photo sensor PS4, both the photo sensors PS3 and PS4 are in the ON-state (a section of T6 in FIG. 4C). If the mover 5 stops facing the photo sensor PS3, the photo sensor PS3 is turned OFF, and the photo sensor PS4 alone is in the ON-state (a section of T7 in FIG. 4C). The mover 5 in this state is represented by a dashed-dotted line in FIG. 4B. Thus, switching of control from the positioning station to the speed control station is performed.

As illustrated in FIG. 4C, the section formed of the sections T1, T2, and T3 is a section in which the first inverter 6 supplies electricity to the primary coil 3. An area in which the mover 5 moves during the section corresponds to the driving area of the positioning station. The same applies to the speed control station.

Figure 5:
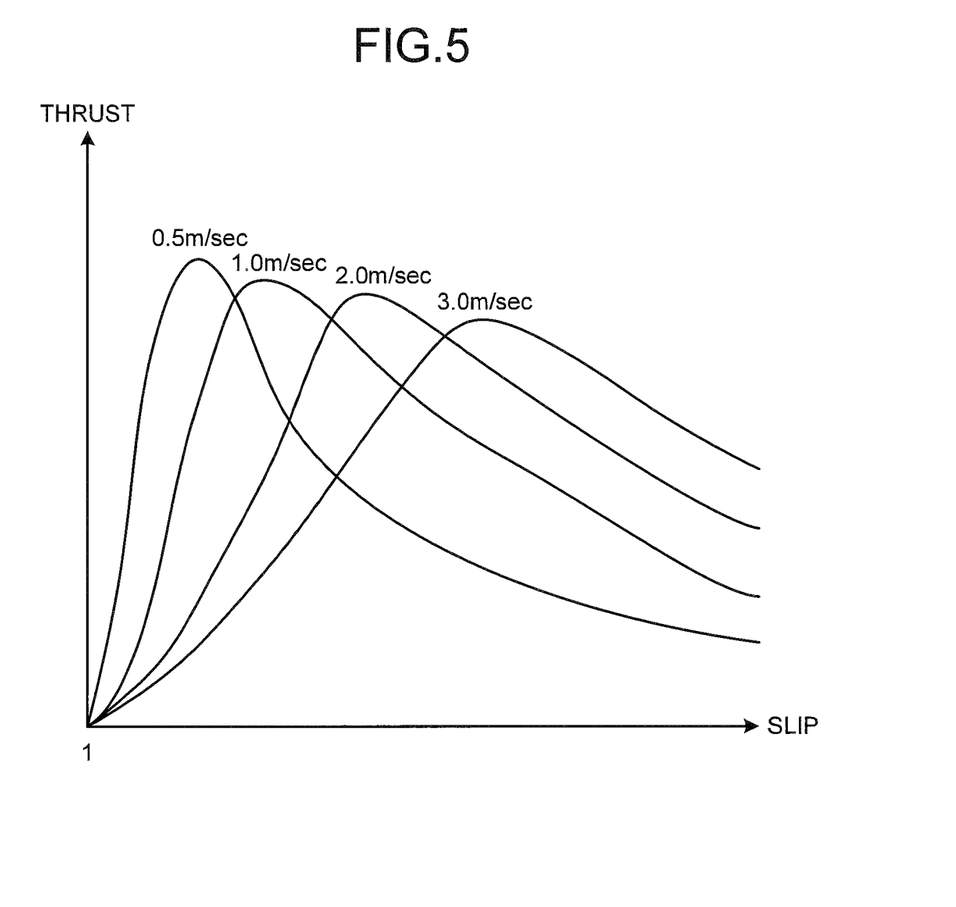
FIG. 5 illustrates parameter curves indicating a slide property that provides the maximum thrust depending on the speed of a mover.
Figure 6:
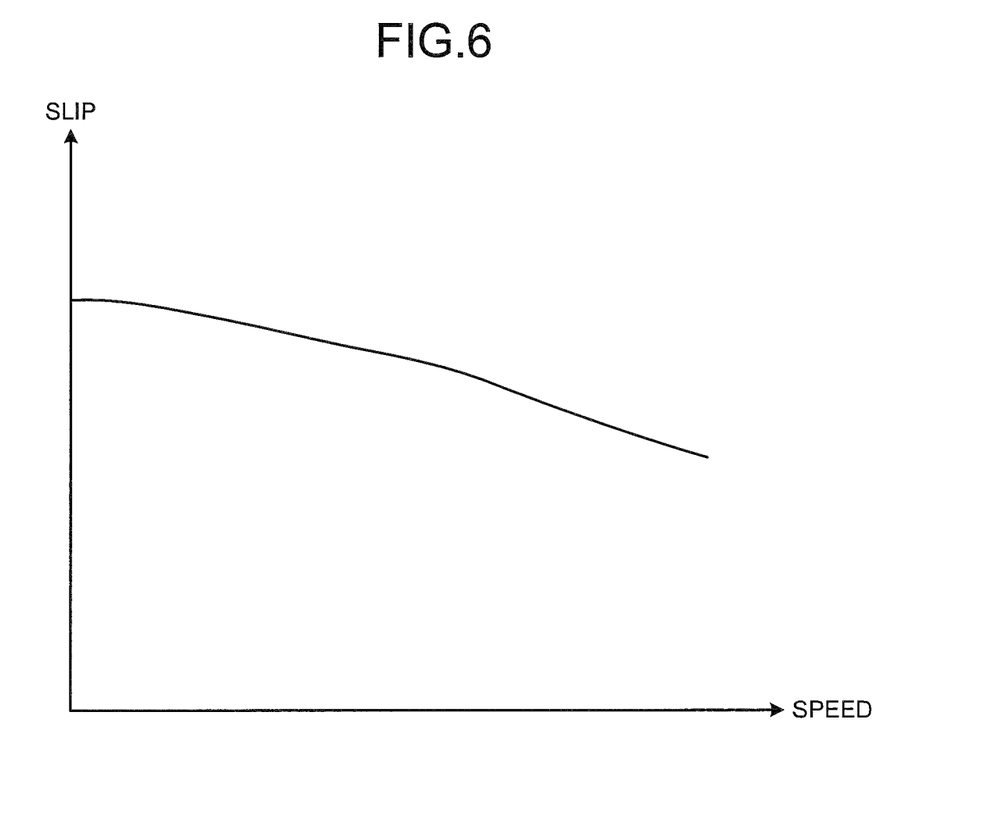
FIG. 6 illustrates an approximate curve indicating a correlation between the speed of the mover and a slide that provides the maximum thrust.

The following describes a correction of a speed reference made by the control circuit unit 74 of the second inverter 7 with reference to FIG. 5 and FIG. 6. Because the controller 8 and the first inverter 6 controls the position and the speed using feedback in the positioning station as described above, the mover 5 moves at a speed in accordance with the speed reference received from the controller 8. By contrast, an actual speed of the mover 5 is reduced in the speed control station compared with the speed reference by a slide unique to an induction motor. As a result, speed fluctuation occurs when the mover 5 moves from the positioning station to the speed control station.

To address this, in the present embodiment, the storage unit 75 of the second inverter 7 stores therein an approximate curve indicating a correlation between the speed of the mover 5 and a slide that provides the maximum thrust (illustrated in FIG. 6, for example) generated using a slide property that provides the maximum thrust depending on the speed of the mover (illustrated in FIG. 5, for example) as a parameter. When the mover 5 moves from the positioning station to the speed control station, the control circuit unit 74 of the second inverter 7 specifies a slide that can provide the maximum thrust with the speed reference received from the controller 8 based on the parameter stored in the storage unit 75. The control circuit unit 74 divides the speed reference by the specified slide, thereby correcting the speed reference received from the controller 8. Thus, the control circuit unit 74 obtains a speed reference for the inside of the inverter. The control circuit unit 74 outputs the speed reference thus corrected to the inverter unit 73, thereby supplying electricity to the primary coil 3. This increases the speed in the speed control station, making it possible to suppress the speed fluctuation of the mover 5 occurring when the mover 5 moves across the positioning station and the speed control station to the minimum.

The parameter stored in the storage unit 75 corresponds to an example of correlation information between a speed of the mover and a slide that provides a maximum thrust disclosed in the claims.

In the conveying system 1 described above, the second inverter 7 performs V/F control based on a speed reference received from the controller 8 in an area that requires no positioning on the conveying path 2. By contrast, the first inverter 6 performs vector control with a sensor using a feedback speed based on a detection signal (feedback position) received from the detector 11 in an area that requires positioning on the conveying path 2. In addition, the controller 8 receives the feedback position from the detector 11 and outputs a speed reference based on the feedback position to the first inverter 6 to perform position control. This can perform speed control of the mover 5 in the area that requires no positioning and carry out highly accurate positioning based on the resolution of the detector 11 in the area that requires positioning. Thus, it is possible to convey the object accurately. In the present embodiment, the first inverter 6 that performs relatively high control is provided only to the area that requires positioning on the conveying path 2, and the second inverter 7 that performs relatively low control is provided to the other areas that require no positioning. This can significantly reduce the number of first inverters 6 compared with a configuration provided with the first inverter 6 alone to carry out highly accurate positioning. Thus, it is possible to simplify the system configuration and reduce the cost. Specifically, this configuration is effectively used in a conveying system that performs long-distance conveyance.

Specifically, in the present embodiment, the primary coils 3 are arranged at the interval L4 in such a manner that the secondary conductor of the mover 5 can face one pole of at least one of the primary coils 3 adjacent to each other. This can prevent the mover 5 from stopping at a position where the mover 5 faces none of the photo sensors 13 of the primary coils 3 and being inoperative because of an emergency stop, for example.

Specifically, in the present embodiment, the first inverter 6 and the second inverter 7 each receive a detection signal directly from the two photo sensors 13 arranged on both ends of the primary coil 3 in the conveyance direction. If at least one of the photo sensors 13 detects the mover 5, the first inverter 6 and the second inverter 7 each supply electricity to the primary coil 3. If neither of the photo sensors 13 detects the mover 5, the first inverter 6 and the second inverter 7 each stop supplying electricity to the primary coil 3. This can reliably supply electricity to the primary coil 3 having the mover 5 in the driving area thereof and stop supplying electricity to the primary coil 3 having no mover 5 in the driving area thereof, making it possible to prevent unnecessary power consumption. The first inverter 6 and the second inverter 7 each receive a detection signal directly from the photo sensors 13, making it possible to keep delay in electric supply for the mover 5 moving at high speed to the minimum. Furthermore, the two photo sensors 13 are provided on both ends of each primary coil 3 in the conveyance direction. This configuration can increase the driving areas of the respective stations compared with the case where only one photo sensor is provided and make the driving areas larger in the movements from both one side and the other side of the conveyance direction. As a result, it is possible to increase the arrangement interval between the primary coils 3.

Specifically, in the present embodiment, the detector 11 arranged at an area that requires positioning on the conveying path 2 detects the scale 12 provided to the mover 5, thereby generating a pulse signal. Providing the scale 12 to the mover 5 in this manner does not require cable wiring, a flexible cable holding member, and other components that are required in the case where the detector 11 is provided to the mover 5. Thus, it is possible to further simplify the configuration and facilitate long-distance conveyance of the object.

The present invention is not limited to the embodiment, and various modifications may be made without departing from the spirit and scope of the invention. The following describes such modifications.

(1) Case where One Inverter is Provided to Primary Coils

While the inverters 6 and 7 are provided to the respective primary coils 3 in the embodiment, the configuration is not limited thereto. Alternatively, one inverter may supply electricity to a plurality of primary coils 3.

Figure 7:
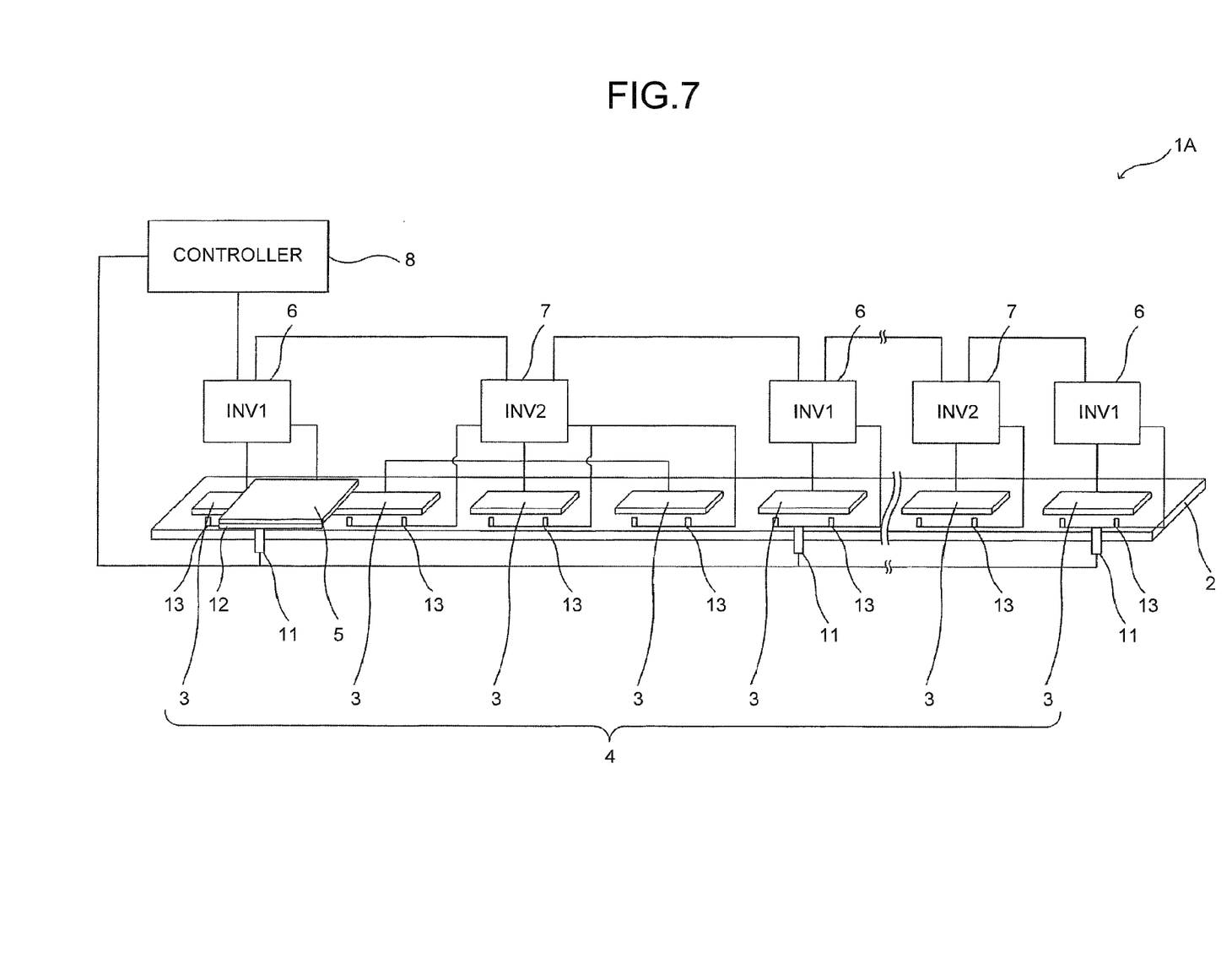
FIG. 7 is a system configuration diagram of a schematic configuration of a conveying system according to a modification in which one inverter is provided to a plurality of primary coils.

In the example illustrated in FIG. 7, one of the second inverters 7 is provided to a plurality of (three in this example) primary coils 3 arranged at an area that requires no positioning on the conveying path 2. In this case, the combination of the second inverter 7 and the primary coils 3 corresponding thereto serves as a "speed control station". This configuration can provide the same advantageous effects as those in the embodiment and reduce the number of second inverters 7. Thus, it is possible to further simplify the system configuration and reduce the cost. Specifically, this configuration is effectively used in long-distance conveyance that requires a large number of speed control stations. The first inverter 6 may also be provided to a plurality of primary coils 3 arranged at an area that requires positioning on the conveying path 2.

(2) Variations of Shape of Conveying Path

The mover 5 moves above the conveying path 2 formed in a linear shape in the embodiment, for example. As described above, the primary coils 5 may be arranged discontinuously at an interval as long as the secondary conductor of the mover 5 can face one pole of at least one of the primary coils 3 adjacent to each other. Thus, the conveying path 2 may have various shapes other than the linear shape.

Figure 8A:
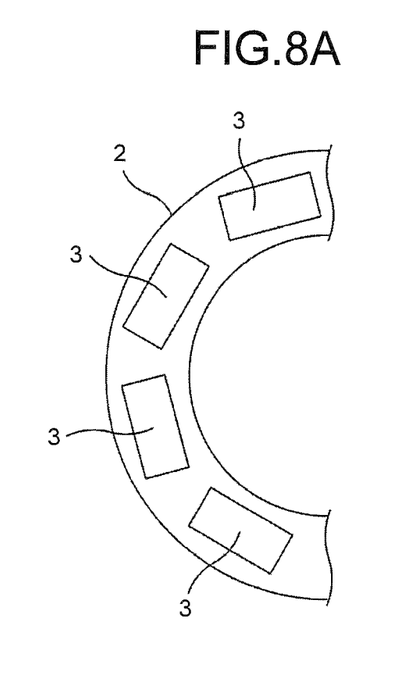
FIG. 8A is a schematic diagram of variation of the shape of a conveying path.
Figure 8B:
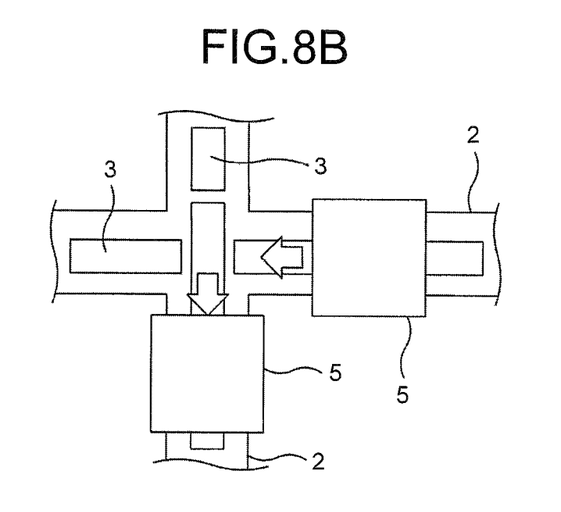
FIG. 8B is a schematic diagram of variation of the shape of a conveying path.

The conveying path 2 may have a curve shape as illustrated in FIG. 8A, for example. Alternatively, the conveying path 2 may have a cross shape formed of a plurality of conveying paths 2 intersecting with each other as illustrated in FIG. 8B, for example.

(3) Others

While the secondary inverter 7 corrects the speed reference based on the parameter stored in the storage unit 75 of the secondary inverter 7 in the description above, the configuration is not limited thereto. The parameter may be stored in a storage unit of the controller 8, and the secondary inverter 7 may acquire the parameter from the storage unit of the controller 8 as needed, thereby correcting the speed reference. Alternatively, the parameter may be stored in the storage unit 65 of the first inverter 6, and the secondary inverter 7 may acquire the parameter from the first inverter 6, thereby correcting the speed reference. Still alternatively, not the secondary inverter 7 but the controller 8 may correct the speed reference, and the controller 8 may output the speed reference thus corrected to the secondary inverter 7.

In the description above, the controller 8 receives the feedback position from the detector 11 to perform position control of the mover 5. Alternatively, the first inverter 6 may receive the feedback position from the detector 11 to perform position control besides vector control with a sensor.

While the AC power supply 14 is used as a power supply for the inverters 6 and 7 in the description above, a DC power supply may be used. In this case, the converter units 61 and 71 of the inverters 6 and 7, respectively, are not required.

In the description above, the detector 11 is provided to the conveying path 2, and the scale 12 is provided to the mover 5. To provide a major advantageous effect to convey the object accurately, the detector 11 may be provided to the mover 5, and the scale 12 may be provided to the conveying path 2 conversely.

While the detector 11 is used as a speed sensor and a position sensor for the mover 5, and the optical photo sensor 13 is used as a sensor that detects whether the mover 5 is present in the description above, the configuration is not limited thereto. Other types of sensors, such as an ultrasonic sensor, a capacitance sensor, a magnetic sensor, and an electromagnetic wave sensor, may be used.

According to an aspect of the embodiment, the conveying system can carry out highly accurate positioning with a simple configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A conveying system comprising:
   a linear induction motor including:
   a stator provided with a plurality of primary coils arranged along a conveying path and;
   a mover provided movably along the conveying path and provided with a secondary conductor facing the primary coils;
   one or more first inverters that are provided corresponding to at least one of the primary coils in one or more areas requiring positioning on the conveying path to perform vector control with a sensor;
   one or more second inverters that are provided corresponding to at least one of the primary coils in one or more areas requiring no positioning on the conveying path to perform V/F control;
   one or more first sensors corresponding to at least one of the primary coils in the one or more areas requiring positioning on the conveying path, the one or more first sensors configured to output a feedback position that is position data of the mover on the conveying path; and a controller that is configured to output a speed reference to the first and second inverters to control electric supply to the primary coils, and to receive the feedback position from one of the one or more first sensors and output the speed reference based on the feedback position to the first inverter to perform position control.

2. The conveying system according to claim 1, wherein the controller is connected to be able to transmit and receive information to and from the first inverter and the second inverter.

3. The conveying system according to claim 2, wherein each of the second inverters comprises a storage unit that stores therein correlation information between speeds of the mover and slides that provide a maximum thrust of the linear induction motor, and
the second inverter is configured to specify the slide capable of providing the maximum thrust with the speed reference received from the controller based on the correlation information and supply electricity to the corresponding primary coil based on a speed reference corrected by dividing the speed reference from the controller by the slide.

4. The conveying system according to claim 3, wherein the primary coils are arranged at an interval in such a manner that the secondary conductor of the mover is capable of facing one pole of at least one of the primary coils adjacent to each other.

5. The conveying system according to claim 2, wherein the controller comprises a storage unit that stores therein correlation information between speeds of the mover and slides that provide a maximum thrust of the linear induction motor, and
the controller is configured to specify the slide capable of providing the maximum thrust with the speed reference output to the second inverter based on the correlation information and correct the speed reference by dividing the speed reference by the slide.

6. The conveying system according to claim 5, wherein the primary coils are arranged at an interval in such a manner that the secondary conductor of the mover is capable of facing one pole of at least one of the primary coils adjacent to each other.

7. The conveying system according to claim 2, wherein the primary coils are arranged at an interval in such a manner that the secondary conductor of the mover is capable of facing one pole of at least one of the primary coils adjacent to each other.

8. The conveying system according to claim 2, wherein the one or more first inverters and the one or more second inverters are configured to:
directly receive detection signals of two or more pairs of two second sensors that are arranged on both ends of the primary coils in a conveyance direction and that detect whether the mover is present;
supply electricity to the corresponding primary coil when at least one of the two second sensors detects the mover; and
stop supplying electricity to the corresponding primary coil when neither of the two second sensors detects the mover.

9. The conveying system according to claim 1, wherein each of the second inverters comprises a storage unit that stores therein correlation information between speeds of the mover and slides that provide a maximum thrust of the linear induction motor, and
the second inverter is configured to specify the slide capable of providing the maximum thrust with the speed reference received from the controller based on the correlation information and supply electricity to the corresponding primary coil based on a speed reference corrected by dividing the speed reference from the controller by the slide.

10. The conveying system according to claim 9, wherein the primary coils are arranged at an interval in such a manner that the secondary conductor of the mover is capable of facing one pole of at least one of the primary coils adjacent to each other.

11. The conveying system according to claim 9, wherein the one or more first inverters and the one or more second inverters are configured to:
directly receive detection signals of two or more pairs of two second sensors that are arranged on both ends of the primary coils in a conveyance direction and that detect whether the mover is present;
supply electricity to the corresponding primary coil when at least one of the two second sensors detects the mover; and
stop supplying electricity to the corresponding primary coil when neither of the two second sensors detects the mover.

12. The conveying system according to claim 1, wherein the controller comprises a storage unit that stores therein correlation information between speeds of the mover and slides that provide a maximum thrust of the linear induction motor, and
the controller is configured to specify the slide capable of providing the maximum thrust with the speed reference output to the second inverter based on the correlation information and correct the speed reference by dividing the speed reference by the slide.

13. The conveying system according to claim 12, wherein the primary coils are arranged at an interval in such a manner that the secondary conductor of the mover is capable of facing one pole of at least one of the primary coils adjacent to each other.

14. The conveying system according to claim 12, wherein the one or more first inverters and the one or more second inverters are configured to:
directly receive detection signals of two or more pairs of two second sensors that are arranged on both ends of the primary coils in a conveyance direction and that detect whether the mover is present;
supply electricity to the corresponding primary coil when at least one of the two second sensors detects the mover; and
stop supplying electricity to the corresponding primary coil when neither of the two second sensors detects the mover.

15. The conveying, system according to claim 1, wherein the primary coils are arranged at an interval in such a manner that the secondary conductor of the mover is capable of facing one pole of at least one of the primary coils adjacent to each other.

16. The conveying system according, to claim 15, wherein the one or more first inverters and the one or more second inverters are configured to:
directly receive detection signals of two or more pairs of two second sensors that are arranged on both ends of the primary coils in a conveyance direction and that detect whether the mover is present;
supply electricity to the corresponding primary coil when at least one of the two second sensors detects the mover; and
stop supplying electricity to the corresponding primary coil when neither of the two second sensors detects the mover.

17. The conveying system according to claim 1, wherein the one or more first inverters and the one or more second inverters are configured to:
directly receive detection signals of two or more pairs of two second sensors that are arranged on both ends of the primary coils in a conveyance direction and that detect whether the mover is present;
supply electricity to the corresponding primary coil when at least one of the two second sensors detects the mover; and
stop supplying electricity to the corresponding primary coil when neither of the two second sensors detects the mover.

18. The conveying system according to claim 1, wherein the one or more first sensors are provided corresponding to at least one of the primary coils in the one or more areas requiring positioning on the conveying path so as to be opposed to a scale provided on the mover.

19. The conveying system according to claim 1, wherein the one or more first sensors are provided on the mover so as to be opposed to a scale provided corresponding to at least one of the primary coils in the one or more areas requiring positioning on the conveying path.

20. A conveying system comprising:
a linear induction motor including:
  a stator provided with a plurality of primary coils arranged along a conveying path; and
  a mover provided movably along the conveying path and provided with a secondary conductor facing the primary coils;
means for performing vector control, the vector control means being provided corresponding to at least one of the primary coils in one or more areas requiring positioning on the conveying path;
means for performing V/F control, the V/F control means being provided corresponding to at least one of the primary coils in one or more areas requiring no positioning on the conveying path;
means for outputting a feedback position that is position data of the mover on the conveying path, the means for outputting a feedback position corresponding to at least one of the primary coils in the one or more areas requiring positioning on the conveying path; and
means for outputting a speed reference to the vector control means and the V/F control means to control electric supply to the primary coils, and for receiving the feedback position from the means for outputting a feedback position and outputting the speed reference based on the feedback position to the vector control means to perform position control.

* * * * *